US009267734B2

(12) United States Patent
Durance et al.

(10) Patent No.: US 9,267,734 B2
(45) Date of Patent: Feb. 23, 2016

(54) MICROWAVE VACUUM-DRYING OF ORGANIC MATERIALS

(71) Applicant: ENWAVE CORPORATION, Vancouver (CA)

(72) Inventors: Timothy D. Durance, Vancouver (CA); Jun Fu, Port Coquitlam (CA); Li Bing Cao, Richmond (CA)

(73) Assignee: ENWAVE CORPORATION, Vancouver (CA)

( * ) Notice: Subject to any disclaimer, the term of this patent is extended or adjusted under 35 U.S.C. 154(b) by 0 days.

(21) Appl. No.: 13/982,984

(22) PCT Filed: Dec. 7, 2012

(86) PCT No.: PCT/CA2012/050880
§ 371 (c)(1),
(2) Date: Jul. 31, 2013

(87) PCT Pub. No.: WO2014/085897
PCT Pub. Date: Jun. 12, 2014

(65) Prior Publication Data
US 2015/0128442 A1    May 14, 2015

(51) Int. Cl.
*F26B 3/347* (2006.01)
*F26B 3/28* (2006.01)
*A23C 19/086* (2006.01)
(Continued)

(52) U.S. Cl.
CPC .................. *F26B 3/28* (2013.01); *A23C 19/086* (2013.01); *A23L 3/54* (2013.01); *F26B 3/347* (2013.01); *F26B 5/048* (2013.01)

(58) Field of Classification Search
CPC ............ F26B 3/28; F26B 3/347; F26B 5/048; A23C 19/086; A23L 3/54
See application file for complete search history.

(56) References Cited

U.S. PATENT DOCUMENTS 3,276,138 A    10/1966    Fritz
4,045,639 A    8/1977    Meisel
(Continued)

FOREIGN PATENT DOCUMENTS

JP    55020614 A    2/1980
JP    6087501 A    3/1994
(Continued)

OTHER PUBLICATIONS

JP55020614, Kagaku Gijiyutsuchiyou Houshiy—English Translation.
(Continued)

*Primary Examiner* — Jiping Lu
(74) *Attorney, Agent, or Firm* — McKee, Voorhees & Sease, PLC

(57) ABSTRACT

An apparatus and method for microwave vacuum-drying of organic materials such as food products. The dehydration apparatus (20) has a vacuum chamber (24) with an input module (28) at one end and a discharge module (32) at the other. The vacuum chamber has access doors (80) spaced between the input end (30) and the discharge end (34) which provide operator and maintenance access. Microwave generators (86) are mounted on each access door and arranged to radiate through a microwave chamber and microwave-transparent window on the access door into the vacuum chamber. A pair of rollers (60) in the vacuum chamber rotates the container of organic material (112) about a horizontal axis, and a chain drive (64) pulls the containers along the rollers through the vacuum chamber.

24 Claims, 6 Drawing Sheets

(51) Int. Cl.
*A23L 3/54* (2006.01)
*F26B 5/04* (2006.01)

(56) References Cited

U.S. PATENT DOCUMENTS

| | | |
|---|---|---|
| 4,356,640 A | 11/1982 | Jansson |
| 4,622,446 A | 11/1986 | Sugisawa et al. |
| 4,622,447 A | 11/1986 | Inoue |
| 4,664,924 A | 5/1987 | Sugisawa et al. |
| 4,882,851 A | 11/1989 | Wennerstrum et al. |
| 5,033,143 A | 7/1991 | Love, III |
| 5,229,010 A | 7/1993 | Fluchel |
| 5,672,370 A | 9/1997 | Durance et al. |
| 5,962,057 A | 10/1999 | Durance et al. |
| 2002/0017033 A1 | 2/2002 | Wefers |
| 2008/0083749 A1 | 4/2008 | Kantor et al. |

FOREIGN PATENT DOCUMENTS

| | | |
|---|---|---|
| WO | WO 2009/049409 A1 | 4/2009 |
| WO | WO 2011/085467 A1 | 7/2011 |

OTHER PUBLICATIONS

JP6087501, Matsushita Electric Ind. Co. Ltd.—English Translation.
Enwave Corporation, PCT/CA2012/050880, filed on Dec. 7, 2012, "International Search Report", mail date Apr. 25, 2013.
International Bureau IPRP Preliminary Report, Issued in connection to International Application No. PCT/CA2012/050880, 7 pages Jun. 18, 2015.

MICROWAVE VACUUM-DRYING OF ORGANIC MATERIALS

CROSS-REFERENCE TO RELATED APPLICATIONS

This is a National Phase application claiming priority to PCT/CA2012/050880 filed Dec. 7, 201.2 which are herein incorporated by reference in their entireties.

BACKGROUND OF THE INVENTION

The invention pertains to apparatuses and methods for microwave vacuum-drying of organic materials, including food products.

Dehydration of organic materials is commonly done in the food processing industry and in the production of biologically-active materials. It may be done in order to preserve the products for storage, or to create a product that is used in the dehydrated form, for example dried herbs and various kinds of chips. One method employed to dehydrate food products and biologically-active materials is microwave vacuum dehydration. Examples of this in the patent literature include WO 2009/049409 A1, Durance et al., published Apr. 23, 2009; WO 2009/033285 A1, Durance et al., published Mar. 19, 2009; and WO 2011/085467 A1, Fu et al., published Jul. 21, 2011. Microwave vacuum-drying is a rapid method that can yield products with improved quality compared to air-dried and freeze-dried products. Because the drying is done under reduced pressure, the boiling point of water and the oxygen content of the atmosphere are lowered, so food and medicinal components sensitive to oxidation and thermal degradation can be retained to a higher degree than by air-drying. The drying process is also much faster than air- and freeze-drying. The present invention is directed to improvements in the art of microwave vacuum-drying.

SUMMARY OF THE INVENTION

According to one aspect of the invention, there is provided an apparatus for dehydrating organic material. A vacuum chamber has an input end for introduction of a container of the organic material into the vacuum chamber and a discharge end for removal of the container. The vacuum chamber has a plurality of access doors that are longitudinally spaced apart between the input end and the discharge end of the vacuum chamber. Each access door has at least one magnetron, the magnetron having a waveguide. Each access door has a respective microwave-transparent window arranged between the waveguide and the vacuum chamber. The at least one magnetron and waveguide on a respective access door are arranged to radiate microwaves through the microwave-transparent window into the vacuum chamber. The apparatus has means for reducing pressure inside the vacuum chamber, means for loading the container into the input end of the vacuum chamber, means for rotating the container inside the vacuum chamber, means for moving the rotating container through the vacuum chamber from the input end to the discharge end, and means for unloading the container of dehydrated organic material at the discharge end.

According to another aspect of the invention, each access door of the vacuum chamber has a plurality of magnetrons, each magnetron having a respective waveguide. The waveguides on each access door are oriented to minimize microwave interference between the magnetrons on the access door. This minimization of microwave interference may be done by having the waveguide openings in the face of an access door oriented at an angle different from the openings of the other waveguides on the access door.

According to another aspect of the invention, the vacuum chamber comprises a plurality of vacuum chamber modules arranged in series, the access doors being arranged such that each vacuum chamber module has a respective access door.

According to another aspect of the invention, there is provided an apparatus for dehydrating organic material, comprising a vacuum chamber having a vacuum chamber access door, magnetrons positioned on the access door and arranged to radiate microwaves through a microwave-transparent window into the vacuum chamber, each magnetron having a respective waveguide. A microwave-transparent window is arranged between the waveguides and the vacuum chamber. The plurality of magnetrons and waveguides on the access door is arranged to radiate microwaves through the microwave-transparent window into the vacuum chamber. The waveguides on the access door are oriented to minimize interference between the magnetrons. The apparatus has means for reducing pressure inside the vacuum chamber and for rotating a container of the organic material inside the vacuum chamber.

According to another aspect of the invention, there is provided a method for dehydrating an organic material. A microwave-transparent container of the material is introduced into a vacuum chamber, the chamber being at a pressure less than atmospheric. The container is rotated inside the vacuum chamber and the rotating container is moved through the vacuum chamber from an input end to an output end while applying microwave radiation from magnetrons positioned on a plurality of access doors of the vacuum chamber through respective microwave-transparent windows, to dehydrate the organic material. The container of dehydrated organic material is then removed from the vacuum chamber.

By providing access doors on the vacuum chamber and positioning the microwave generators and microwave-transparent window on the door, the invention permits operator and maintenance access to the interior of the vacuum chamber and to the microwave generators, without the need for disassembling the dehydration apparatus.

Examples of organic materials suitable for dehydration by the invention include fruit, either whole, puree or pieces, either frozen or un-frozen, including banana, mango, papaya, pineapple, melon, apples, pears, cherries, berries, peaches, apricots, plums, grapes, oranges, lemons, grapefruit; vegetables, either fresh or frozen, whole, puree or pieces, including peas, beans, corn, carrots, tomatoes, peppers, herbs, potatoes, beets, turnips, squash, onions, garlic; fruit and vegetable juices; pre-cooked grains including rice, oats, wheat, barley, corn, flaxseed; vegetable gums; drugs; material pieces in which a hydrocolloid or gum surrounds and encapsulates a droplet or particle of a relatively less stable material as a means of protecting and stabilizing the less sensitive material; meats, fish and seafoods, either fresh or frozen, either whole or pieces; dairy products such as cheese and curds.

These and other features of the invention will be apparent from the following description and drawings of the preferred embodiments.

DESCRIPTION OF THE PREFERRED EMBODIMENTS

Figure 1:
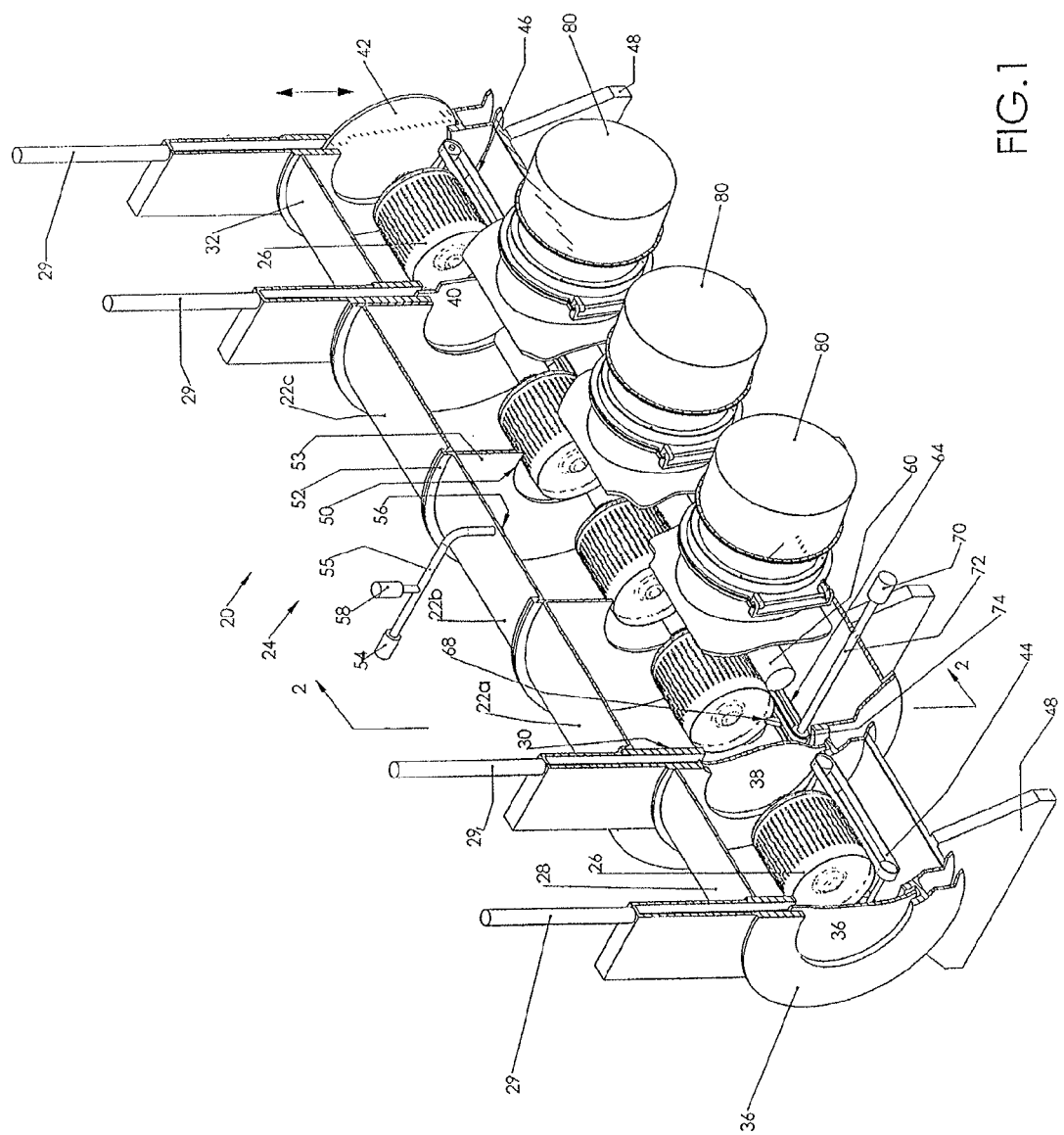
FIG. 1 is an isometric and schematic, cutaway view of a dehydration apparatus according to one embodiment of the invention.
Figure 2:
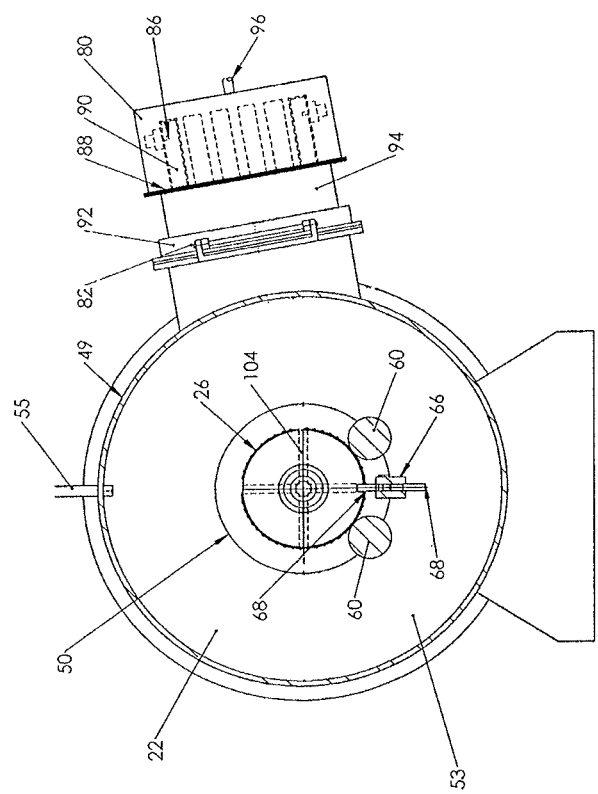
FIG. 2 is a sectional view across the vacuum chamber on the line 2-2 of FIG. 1.
Figure 3:
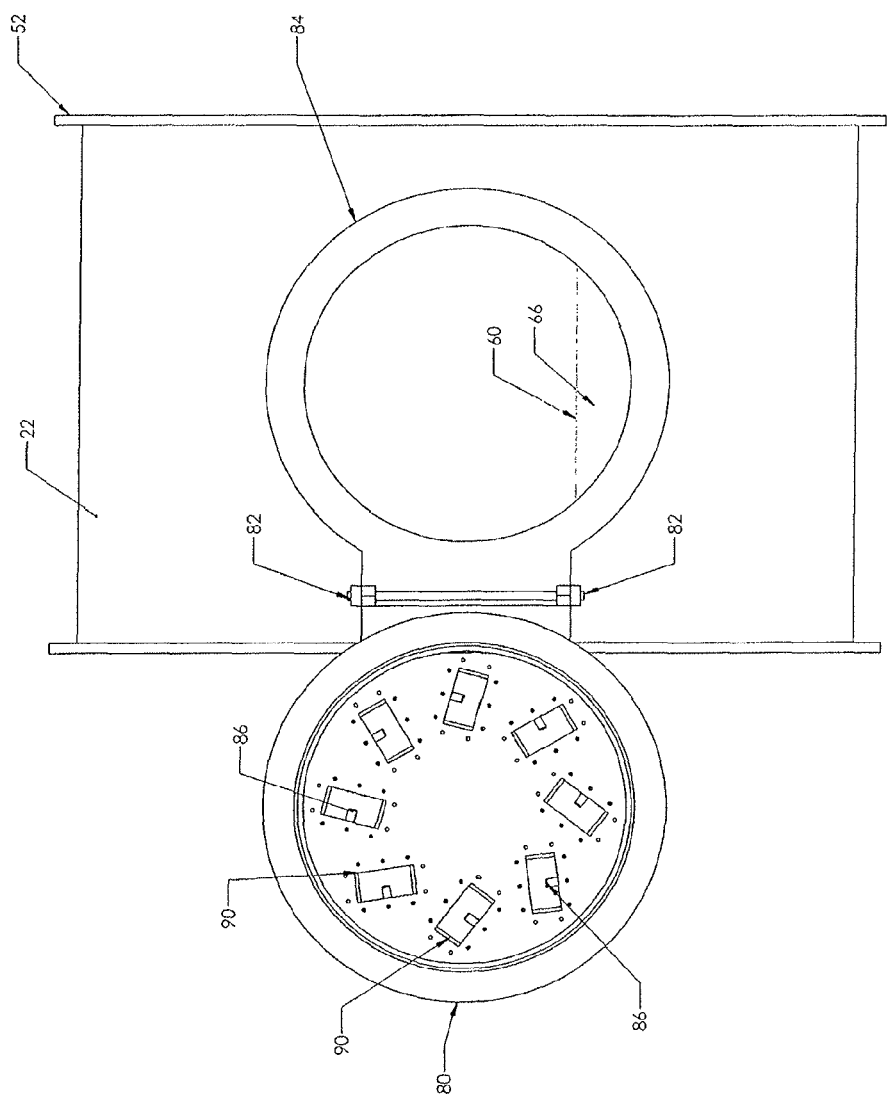
FIG. 3 is an elevational view of a vacuum chamber module of the apparatus of FIG. 1, with the access door in the open position.

Referring first to FIGS. 1-3, the dehydrating apparatus 20 has a plurality of vacuum chamber modules 22 which are connected together in series, i.e. end to end, to form a single vacuum chamber 24 through which a container 26 of organic material is transported for dehydration. For purposes of convenient illustration, the vacuum chamber 24 is shown in the drawings to comprise three modules 22a, 22b and 22c; however, the vacuum chamber 24 may comprise any number of modules 22 that is suitable for a particular application and production capacity, for example, ten modules are more.

A loading module 28 is positioned at the input end 30 of the first vacuum chamber module 22a for introduction of the containers 26 into the vacuum chamber 24. A discharge module 32 is positioned at the output or discharge end 34 of the last vacuum chamber module 22c for removal of the containers. The loading module 28 and discharge module 32 each have a pair of airlock doors, respectively 36, 38 and 40, 42. These permit the containers to be loaded into and unloaded from the vacuum chamber, while maintaining the chamber at the reduced pressure required for the dehydration process. The airlock doors are self-sealing doors that are moveable within a housing by the piston of an air cylinder 29. Lifting a door opens it and allows a container to pass; lowering the door closes it and forms an airtight seal. The loading and discharge modules 28, 32 have motor-driven conveyors 44, 46, respectively, for moving the containers. The dehydration apparatus is oriented with its longitudinal axis substantially horizontal, supported on support stands 48.

Each vacuum chamber module 22 is a generally cylindrical structure having a circumferential side wall 49. Flanges 52 at each end of a module 22 are configured for airtight mating attachment to an adjacent flange, for connecting the vacuum chamber modules together and for connecting the first vacuum chamber module 22a in the series to the loading module 28, and the last vacuum chamber module 22c in the series to the discharge module 32. The vacuum chamber modules thus form an airtight, unitary vacuum chamber 24 extending between the loading module and the discharge module. The vacuum chamber modules have a partial end wall 53 having an opening 50 which provides a passageway between adjacent vacuum chamber modules for movement of the containers 26 from one module to an adjacent module. This passageway has a cross-sectional area that is smaller than the cross-sectional area for movement of the container within a vacuum chamber module, i.e. the area of the opening 50 is smaller than the cross-sectional area across the vacuum chamber module. This acts as a microwave choke, to minimize cross interference between chamber modules.

The dehydration apparatus 20 includes a vacuum pump 54 operatively connected via a conduit 55 to a vacuum distributor (not shown), which in turn connects vacuum ports 56 in the vacuum chamber modules 22 and in the loading and discharge modules 28, 32. Alternatively, the vacuum ports may be connected to a vacuum source such as the central vacuum system of a plant. A condensor 58 is connected between the vacuum ports 56 and the vacuum pump 54. For convenience of illustration, only a single vacuum port 56 is shown in FIG. 1, but it will be understood that multiple ports 56 may be provided as necessary in the vacuum chamber and the loading and discharge modules.

The apparatus includes a refrigeration unit 96 for cooling liquid, comprising a compressor, cooling fan and refrigerant pump, connected to convey refrigerant to the condensor and the microwave generators and thus maintain them at a desired temperature.

As seen in FIGS. 1 and 2, the vacuum chamber 24 has a pair of rotatable rollers 60 extending longitudinally through the vacuum chamber modules and arranged to support and rotate the containers 26. The rollers are arranged to be driven by a drive motor (not shown). For transport of the containers 26 through the vacuum chamber, a chain drive 64 is provided in the lower part of the vacuum chamber. It comprises a chain 66 having spaced-apart dogs 68 for engaging the rearward edge of the containers, and arranged to be driven in a closed loop by a drive motor 70, drive shaft 72 and gears 74 which engage the chain. Intermediate chain support wheels are provided between the forward and rearward end of the chain loop to support the chain in proximity to the lower side of the containers. The chain drive 64 is accordingly capable of moving the containers within the vacuum chamber from the input end of the first vacuum chamber module 22a to the output end of the last vacuum chamber module 22c by sliding the containers along the rollers 60. The rollers 60 and chain 66 extend throughout the length of the vacuum chamber, i.e. through the vacuum modules 22 and the opening 50 between them.

Each vacuum chamber module 22 has an access door 80 pivotally attached by hinges 82 to the side wall of the vacuum chamber module and covering an access port 84. The access port is oriented at an angle from horizontal to aid in drainage of condensate and wash water. The access port is sized to provide operator and maintenance access to the interior of the vacuum chamber. For example, the access port may be about 60 cm in diameter on a vacuum chamber module having an outer diameter of about 140 cm. The access door 80 latches securely and releasably to the vacuum chamber and forms an airtight seal with the rim of the port 84. A set of magnetrons (microwave generators) 86 is mounted inside an inner wall 88 of the access door, with the magnetron antennas protruding into respective waveguides 90. The waveguides are recesses in the inner wall 88 of the access doors, rectangular in elevation view, open at the inner wall or face 88 of the access door and each oriented at an angle different from that of the other waveguides of the access door. The different angles reduce interference between magnetrons, thereby minimizing heating of one magnetron by another, reducing the potential for arcing in the vacuum chamber and resulting in a more uniform microwave field in the vacuum chamber. In the illustrated embodiment, there are eight magnetrons in each access door 80. More or fewer may be provided, depending upon the power and drying requirements for a particular application. As best seen in FIG. 3, the magnetrons 86 and waveguides are arranged in a generally circular array around the face of the door, each oriented at an angle relative to the other magnetrons and waveguides in the set. The magnetrons are connected to a power source (not shown) to provide the required electric power. An exemplary set of magnetrons on each access door comprises eight magnetrons of 1.5 kW each, for a power output of 12 kW for each vacuum chamber module 22. The apparatus as illustrated, having three vacuum chamber modules, would accordingly have a total power output of 36 kW. Coolant is pumped to circulate around the magnetrons from the cooling liquid refrigeration unit 96. A microwave-transparent window 92, made for example of Teflon, is provided on each access door 80 at its inner side, in close proximity to the wall of the vacuum chamber module. A microwave chamber 94 is positioned between the magnetrons 86 and the window 92. There is an airtight seal between the window 92 and the access door 80; when the access door is closed and the vacuum chamber is evacuated, the window 92 forms a wall of the vacuum chamber. Outside the window, in the microwave chamber 94, the pressure remains atmospheric.

The dehydration apparatus 20 includes a programmable logic controller (PLC), programmed and connected to control the operation of the system, including the conveyor and chain drive motors, the airlock doors, the microwave generators, the vacuum pump and the refrigerant pump.

Figure 4:
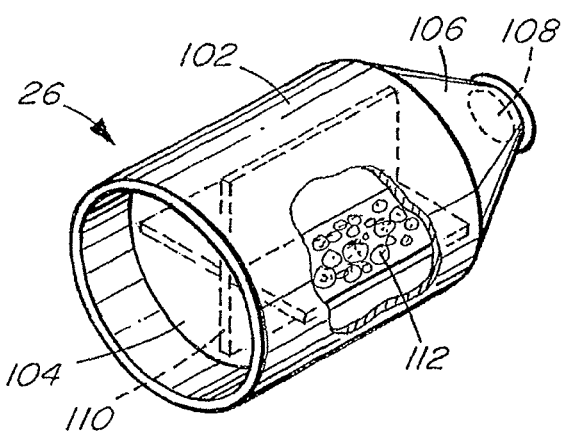
FIG. 4 is an isometric view, partly cutaway, of a container for the organic material.

As shown in FIG. 4, the container 26 is a basket, made of suitable microwave-transparent material such as high density polyethylene, with a cylindrical side wall 102, a closed bottom wall 104, a frustoconical top wall 106, with an opening 108 at the top end. Interior dividers 110 which extend between the bottom wall and the lower ledge of the frustoconical wall, divide the interior space into four segments. In use, organic material for dehydration is loaded into the container to a level such that, when the container is rotated about its longitudinal axis, in a horizontal position, the organic material is retained inside the container by the frustoconical wall and does not spill out the opening 108, which is not closed during the dehydration process.

The dehydration apparatus 20 operates according to the following method. The airlocks 38 and 42 are closed. The vacuum pump, conveyor drive motors, chain drive motor, microwave generators and refrigerant pump are actuated, all under the control of the PLC. Pressure within the vacuum chamber is reduced to a pressure in the range of 0.01 to 100 Torr (1.333 to 13,332 Pa), alternatively about 0.1 to 30 Torr (13.33 to 4,000 Pa). The organic material 112 to be dehydrated is put into the container and the container is placed in the loading module, with the open end 108 forward. The outer airlock door 36 is closed and the loading module is evacuated to the pressure of the vacuum chamber. The inner airlock door 38 is then opened and the container is transported, by the conveyor 44 and the chain drive 64, into the first vacuum chamber module 22a of the vacuum chamber 24. Once the container is fully inside the vacuum chamber module 22a, the loading chamber is prepared for receiving a second container, by closing the inner airlock door 38, venting the loading module to atmospheric pressure and opening the outer airlock door 36. The dehydration apparatus is thus able to process multiple containers of organic material at the same time, in a continuous process. Inside the vacuum chamber 24, the container is rotated on the rollers 60, about a substantially horizontal axis, tumbling the organic material within the container, while the container is being pulled along the rollers by the chain drive 64, and while the microwave generators 86 irradiate the material and dehydrate it, i.e. reduce its moisture to a desired level. This process continues as the container is pulled through the vacuum chamber modules 22b and 22c. The container then enters the discharge module 32, where it is conveyed toward the outer airlock door 42. The inner airlock door 40 is then closed, the discharge module is vented to the atmosphere, the outer airlock door 42 is opened and the container is removed. The container is then inverted to release the dehydrated organic material from it through the opening 108. The discharge module is prepared for the next container to be removed from the vacuum chamber by closing the outer airlock door 42, evacuating the discharge module to the reduced pressure of the vacuum chamber, and opening the inner airlock door.

Figure 5:
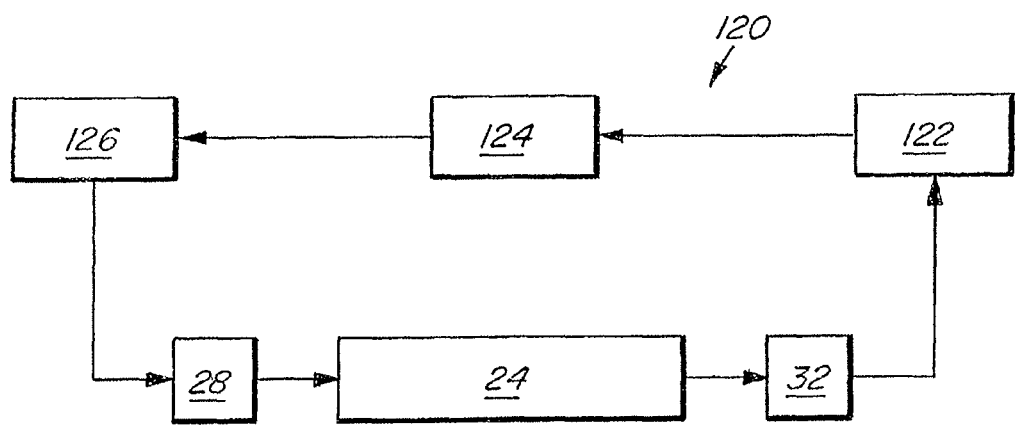
FIG. 5 is a schematic view of an apparatus according to a second embodiment of the invention.

As shown in FIG. 5, the dehydration apparatus 20 may be incorporated into a production line 120. The vacuum chamber 24, the loading module 28 and discharge module 32 are arranged together as described above. Downstream of the discharge module is an emptying station 122 for emptying the containers of their dehydrated contents, followed by a washing station 124 for washing the emptied containers, followed by a filling/refilling station 126 for filling the washed containers with organic material to be dehydrated. The filled containers are then conveyed to the loading module 28. Since the containers 26 have an open end and no lid, they are readily emptied, washed and filled or refilled by automated means requiring little or no action by an operator.

Figure 6:
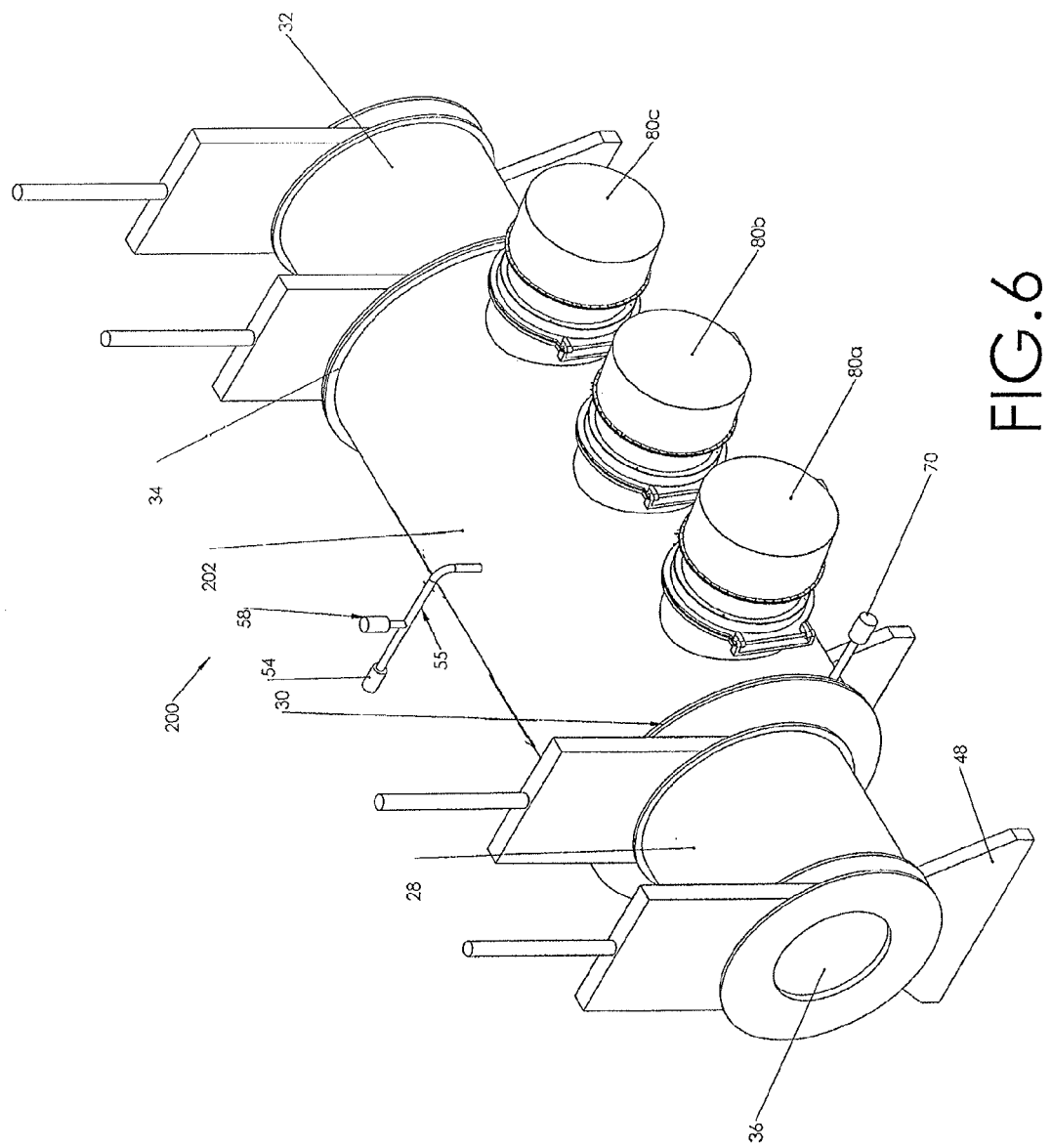
FIG. 6 is an isometric view of a dehydration apparatus according to a third embodiment of the invention.

It will be understood that it is a matter of manufacturing and operational convenience for the vacuum chamber to be built of separate vacuum chamber modules. For example, a production line can be built to any desired length or capacity using standard modules. Transportation of the apparatus from the manufacturer to the user for assembly is facilitated by modular design. A damaged module can be repaired without substantially affecting the rest of the apparatus. However, modular design is not essential to the invention. Thus, in a further embodiment of the dehydration apparatus, the vacuum chamber comprises a unitary structure rather than a plurality of vacuum chamber modules attached together. Referring to FIG. 6, a dehydration apparatus 200 is substantially the same as the dehydration apparatus 20 described above, except that the vacuum chamber 202 is a single unitary structure and does not comprise separate vacuum chamber modules connected together. Multiple access doors 80a, 80b and 80c are provided along the length of the vacuum chamber 202 between the input end 30 and output end 34. These access doors provide operator and maintenance access to the interior of the vacuum chamber and to the microwave generators 86 mounted in each of the doors, the same as that provided by the access doors 80 in the individual vacuum chamber modules of the modular drying apparatus 20.

Figure 8:
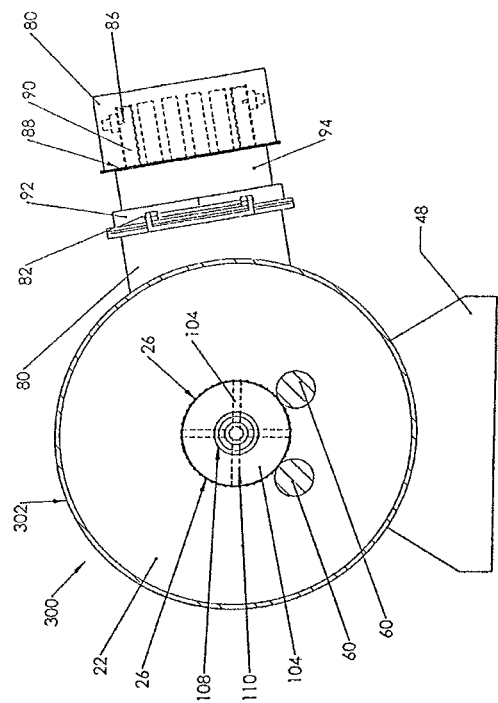
FIG. 8 is a sectional view across the dehydration apparatus of FIG. 7.
Figure 7:
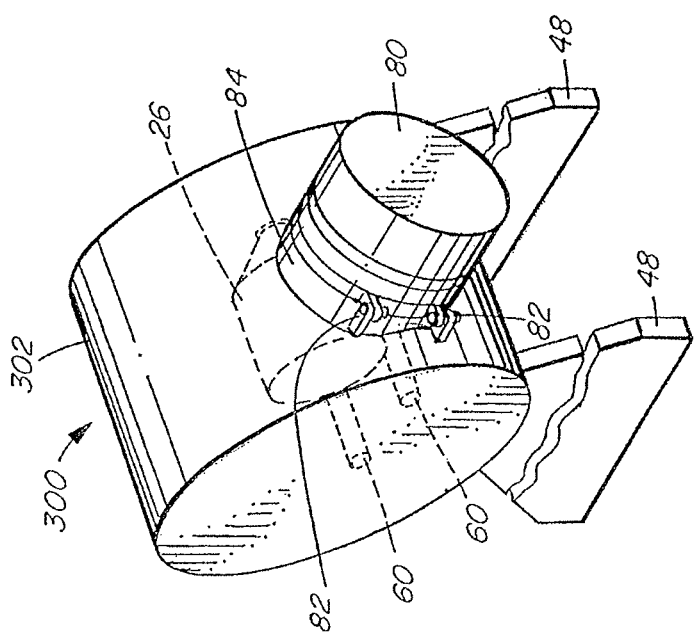
FIG. 7 is an isometric view of a dehydration apparatus according to a fourth embodiment of the invention.

The invention also includes a dehydration apparatus and method in which there is a single vacuum module rather than the multiple ones as described above. Referring to FIGS. 7 and 8, a dehydration apparatus 300 comprises a vacuum chamber 302 having an access door 80 with a set of microwave generators 86 and microwave-transparent window 92, rotatable support rollers 60, and is substantially the same as a vacuum chamber module 22 as described above, except that it does not have means to convey the container along the support rollers 60, and is not adapted for connection to a loading module or discharge module, these modules not being required as the access door 80 is to be opened to load and unload the container of organic material. The drying apparatus 300 is accordingly intended for batch drying rather than a continuous process. The container 26 of organic material to be dehydrated is placed in the vacuum chamber 302 through the access port 84. The access door 80 is then sealed and the vacuum chamber is evacuated. After dehydration, the vacuum chamber is vented to the atmosphere, the access door is opened and the container of dehydrated materials is removed. Such operation may mechanized or done manually by an operator.

Throughout the preceding description and the drawings, in which corresponding and like parts are identified by the same reference characters, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Example 1

Cubes of cheese were dehydrated using a dehydration apparatus of the batch-processing type shown in FIGS. 7 and 8 to produce a dehydrated cheese snack product. A 5 kg block of light old cheddar cheese having a moisture content of 44.5% and a fat content of 19% was cut into 1 cm$^3$ cubes. The average piece volume and weight was 1.0 cm$^3$ and 2.34 g. The pieces were loaded into the container of the type shown in FIG. 4 and the container was placed in the vacuum chamber. The chamber was evacuated. Pressure in the vacuum chamber was in the range of 18-22 Torr. The container was rotated at 8.5 rpm. The dehydration process was run for 55 minutes, during which the microwave power output was varied as follows: 1.5 kW for 10 minutes, 3 kW for 6 minutes, 1.5 kW for 4 minutes, 3 kW for 2 minutes, and lastly 4.5 kW for 15 minutes. (1.5 kW was produced by powering a single magnetron of the set of eight magnetrons on the vacuum chamber access door, 3 kW by powering two magnetrons, and so on.) The dehydrated cheese pieces were removed from the vacuum chamber. Their temperature was 79-81° C. The average piece volume and weight was 4.2 cm$^3$ and 1.37 g. The total product weight was 2.8 kg.

Example 2

The process of Example 1 was repeated using 10 kg of the cheese cubes. The dehydration process was run for 79.7 minutes, during which the microwave power output was varied as follows: 4.5 kW for 4 minutes, 3 kW for 11 minutes, 4.5 kW for 1.7 minutes, 3 kW for 14 minutes, 4.5 kW for 6 minutes, 3 kW for 4 minutes, and lastly 4.5 kW for 39 minutes. The results were the same as described above in Example 1, except that the dehydrated cheese pieces were hotter upon removal from the vacuum chamber, being in the range of 89-93° C., and the total product weight was 5.6 kg.

The invention claimed is:

1. An apparatus for dehydrating organic material, comprising:
   a vacuum chamber having an input end for introduction of a container for the organic material into the vacuum chamber and a discharge end for removal of the container;
   the vacuum chamber having a plurality of access doors into the vacuum chamber, the access doors being longitudinally spaced apart along the vacuum chamber between the input end and the discharge end;
   each said access door having a plurality of magnetrons, each magnetron having a respective waveguide;
   each said access door having a respective microwave-transparent window arranged between the waveguide and the vacuum chamber;
   the plurality of magnetrons and wavegaides on a respective access door being arranged to radiate microwaves through the microwave-transparent window into the vacuum chamber;
   each waveguide on a respective access door having an opening in a face of said respective access door, each opening being oriented at an angle different from the openings of the other said waveguides on said access door to minimize microwave interference between the magnetrons on said access door;
   means for reducing pressure side the vacuum chamber;
   means for loading the container into the input end of the vacuum chamber;
   means for rotating the container inside the vacuum chamber;
   means for moving the rotating container through the vacuum chamber from the input end to the discharge end thereof; and
   means for unloading the container of dehydrated organic material from the vacuum chamber at the discharge end thereof.

2. An apparatus according to claim 1, wherein the vacuum chamber comprises a plurality of vacuum chamber modules arranged in series and wherein the plurality of access doors is arranged such that each said vacuum chamber module has a respective access door.

3. An apparatus according to claim 2, wherein a passageway between adjacent modules for movement of the container from one module to an adjacent module has a cross-sectional area that is smaller than the cross-sectional area of a passageway for movement of the container within a module.

4. An apparatus according to claim 3, wherein the passageway between adjacent modules is a microwave choke.

5. An apparatus according to claim 1, wherein the access doors are pivotally attached to the vacuum chamber.

6. An apparatus according to claim 1, wherein the magnetrons on each access door are arranged in a generally circular array.

7. An apparatus according to claim 1, wherein each microwave-transparent window is mounted on a respective access door.

8. An apparatus according to claim 1, wherein the means for rotating the container comprises two or more rotatable rollers extending longitudinally through the vacuum chamber.

9. An apparatus according to claim 1, wherein the means for rotating the container is arranged to rotate it about a horizontal axis.

10. An apparatus according to claim 1, wherein the means for moving the rotating container comprises a conveyor arranged to engage the container and pull the container along the rotatable rollers.

11. An apparatus according to claim 10, therein the conveyor is a chain drive.

12. An apparatus according to claim 1, wherein the means for loading comprises an air lock.

13. An apparatus according to claim 1, wherein the means for unloading comprises an air lock.

14. An apparatus according to claim 1, wherein the container has an open end that is frustoconical.

15. An apparatus according to claim 14, wherein the means for rotating the container is arranged to rotate it about a horizontal axis that extends through the open, frustoconical end of the container.

16. An apparatus according to claim 1, further comprising a microwave chamber between the magnetrons and the respective microwave-transparent window, the microwave chamber being adapted to be at atmospheric pressure.

17. An apparatus according to claim 1 further comprising means for cooling the magnetrons.

18. An apparatus according to claim 1, wherein the dehydration apparatus further comprises an emptying station for emptying the container of dehydrated material, a washing station for washing the emptied container and a filling station for filling the washed container with organic material to be dehydrated.

19. An apparatus for dehydrating organic material, comprising:
   a vacuum chamber;
   a vacuum chamber access door on the vacuum chamber;
   the access door having a plurality of magnetrons, each magnetron having a respective waveguide;
   a microwave-transparent window arranged between the waveguides and vacuum chamber;
   the plurality of magnetrons and waveguides on the access door being arranged to radiate microwaves through the microwave-transparent window into the vacuum chamber;
   each waveguide having an opening in a face of the access door, each opening being oriented at an angle different from the openings of the other waveguides on the access door to minimize microwave interference between the magnetrons on the access door;
   means for reducing pressure inside the vacuum chamber; and
   means for rotating a container for the organic material inside the vacuum chamber.

20. A method for dehydrating an organic material, comprising the steps of:
   introducing a microwave-transparent container holding the organic material to be dehydrated into a vacuum chamber;
   reducing pressure in the vacuum chamber to a pressure less than atmospheric;
   rotating the container inside the vacuum chamber;
   moving the rotating container through the vacuum chamber from an input end to a discharge end while applying microwave radiation from magnetrons positioned on a plurality of access doors of the vacuum chamber through a respective microwave-transparent window into the vacuum chamber to dehydrate the organic material, each magnetron having a respective waveguide, each waveguide on a respective access door having an opening in a face of said respective access door, each opening being oriented at an angle different from the openings of the other said waveguides on said access door to minimize microwave interference between the magnetrons on said access door; and
   removing the container of dehydrated organic material from the vacuum chamber.

21. A method according to claim 20, wherein the container is rotated about a horizontal axis.

22. A method according to claim 21, wherein the horizontal axis extends through an open frustoconical end of the container.

23. A method according to claim 20, wherein moving the rotating container through the vacuum chamber comprises moving it through a plurality of vacuum chamber modules arranged in series, each said module having a respective one of the access doors.

24. A method according to claim 20, wherein the microwave radiation from the magnetrons passes through a microwave chamber at atmospheric pressure before passing through the microwave-transparent window into the vacuum chamber.

* * * * *